US 8,213,871 B1
Jul. 3, 2012

(12) United States Patent
Cogan (10) Patent No.: US 8,213,871 B1
(45) Date of Patent: Jul. 3, 2012

(54) DATA MANAGEMENT TOOL (75) Inventor: Ladd Cogan, Weston, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1171 days.

(21) Appl. No.: 12/033,883

(22) Filed: Feb. 19, 2008

(51) Int. Cl.
*H04B 17/00* (2006.01)

(52) U.S. Cl. .................. 455/67.11; 455/425; 455/456.3; 455/560; 455/423; 455/67.13; 455/424; 709/204; 709/205; 379/27.04; 379/14.01; 379/15.05; 379/88.23; 379/903; 379/420.01; 379/406.01; 702/81; 705/59; 726/23

(58) Field of Classification Search .................. 455/425, 455/456.3, 560, 423, 67.11, 67.13, 424; 709/204, 709/205; 379/27.04, 14.01, 15.05, 88.23, 379/903, 420.01, 406.01; 702/81; 705/59; 726/23
See application file for complete search history.

(56) References Cited

U.S. PATENT DOCUMENTS

| | | | | | |
|---|---|---|---|---|---|
| 5,031,204 | A | * | 7/1991 | McKernan | 455/560 |
| 5,425,076 | A | * | 6/1995 | Knippelmier | 379/27.04 |
| 5,495,531 | A | * | 2/1996 | Smiedt | 705/59 |
| 5,933,776 | A | * | 8/1999 | Kirkpatrick | 455/423 |
| 6,223,032 | B1 | * | 4/2001 | Cuffaro | 455/425 |
| 6,625,448 | B1 | * | 9/2003 | Stern | 455/425 |
| 7,020,441 | B2 | * | 3/2006 | Adams et al. | 455/67.11 |
| 7,047,279 | B1 | * | 5/2006 | Beams et al. | 709/204 |
| 7,152,092 | B2 | * | 12/2006 | Beams et al. | 709/204 |
| 7,231,187 | B2 | * | 6/2007 | Adams et al. | 455/67.11 |
| 2002/0028659 | A1 | * | 3/2002 | Adams et al. | 455/67.1 |
| 2002/0133721 | A1 | * | 9/2002 | Adjaoute | 713/201 |
| 2004/0153269 | A1 | * | 8/2004 | Kalas, Jr. | 702/81 |
| 2009/0299788 | A1 | * | 12/2009 | Huber et al. | 705/7 |

* cited by examiner

*Primary Examiner* — April G Gonzales (57) ABSTRACT

A data management tool is provided. The tool comprises a first processor, a server application that, when executed on the first processor, manages allocation of equipment serial numbers (ESNs) used in executing test cases related to mobile devices, aggregates test progress data in a defect board, maintains a test chat forum, and sends a notification of a defect when the defect is reported to the server application, a second processor, and a thick client that, when executed on the second processor, receives the notification of the defect, participates in the test chat forum and requests one of the equipment serial numbers from the server application.

18 Claims, 5 Drawing Sheets

DATA MANAGEMENT TOOL

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Software applications in the telecommunications industry require intensive and rigorous testing. Applications approaching final release may be tested in many combinations of hardware and software configurations and simulated user environments. The applications may provide telecommunications functions such as providing two-way voice communications, data communications, three-way calling, and others. The applications may provide telecommunications support or management functions. For example, the applications may promote provisioning or adding a new mobile phone to a subscriber account and bringing the mobile phone into service. The applications may promote monitoring a load on a network node such as a router, a local exchange switch, or a mobile switching center. To test new hardware and/or software configurations that provide telecommunications functions, test calls may be made from an originating device, for example a mobile phone, to a terminating device, for example another mobile phone or a fixed phone. Alternatively, portions or nodes of a telecommunications network may be tested independently of the remainder of the network to verify just the functionality associated with that node.

In testing a mobile phone provisioning application, for example, a dummy equipment serial number (ESN) may need to be provided to complete provisioning and bringing into service the new mobile phone account. As the mobile phone provisioning application may be designed to enforce uniqueness of equipment serial numbers, a tester may be required to provide a previously unused dummy equipment serial number when testing the provisioning application. For example, to confirm that a mobile phone provisioning application supports adding at least two mobile phones to a single account, the tester may need to provision a second mobile phone on an account. If the dummy equipment serial number provided by the tester has already been used to provision another account in the test provisioning system, the test case may fail not because of lack of support for the multi-phone capability but rather because of the already used equipment serial number.

Challenges of testing telecommunications equipment and applications arise related to the typically large volume of activity that is tested and also related to the large number of different features provided by the equipment and applications. These challenges include coordination among test team members.

SUMMARY

In an embodiment a system testing tool is provided. The system testing tool comprises a first processor and a server application. When executed on the first processor, the server application manages allocation of equipment serial numbers (ESNs) used in executing test cases related to mobile devices and aggregates test progress data in a defect board. The server application also maintains a test chat forum and sends a notification of a defect when the defect is reported to the server application. The system testing tool also comprises a second processor and a thick client. When executed on the second processor, the thick client receives the notification of the defect, participates in the test chat forum, and requests one of the equipment serial numbers from the server application.

In another embodiment, a method of testing a communication system is provided. The method comprises a plurality of testing clients requesting an equipment serial number (ESN) from a testing server. The method further includes the testing server reserving a plurality of equipment serial numbers for the testing clients from a pool of unused equipment serial numbers and sending the equipment serial numbers to the testing clients. The method also includes generating a list of unused reserved equipment serial numbers and returning the unused reserved equipment serial numbers to the pool of unused equipment serial numbers.

In another embodiment, another method of testing is provided. The method comprises a first testing client sending a first test defect report to a testing server, the first test defect report based on a defect template. The method also comprises the testing server sending notification of the first test defect report to a second testing client, the testing server posting the first test defect to a chat room and to a defect board. The method also comprises the testing server maintaining a miscellaneous information board, the miscellaneous information including at least contact information of a plurality of test team members. The first test defect is related to a test case related to testing at least one of a mobile phone provisioning application and at least a portion of a mobile phone communication system.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Several embodiments of a system testing tool and data management system for use in testing telecommunications systems and applications are taught that provide orderly distribution of equipment serial numbers for use in testing and that facilitate sharing of information about defect status. This may reduce the duplication of effort and the wasted effort of testing team members. This may be helpful to a testing team which is distributed across multiple locations. In an embodiment, the data management system manages data related to testing and defects detected by the testing.

The system allocates equipment serial numbers for use in testing mobile phone provisioning applications and/or mobile phone telecommunication services. In some contexts, equipment serial numbers employed in testing may be referred to as dummy equipment serial numbers. The allocation reduces the likelihood that testers may reuse an allocated equipment serial number and experience a failed test due to the system rejecting the erroneous reuse of an equipment serial number. For example, an equipment serial number must be a unique identifier associated with a single physical phone. A robust provisioning software application is designed to anticipate and prevent user input errors which might otherwise corrupt and damage provisioning data in the system. Specifically, it may be desirable and correct behavior for a provisioning application to reject an attempt to initiate a mobile phone service using an equipment serial number which has already been associated with another mobile phone service or account known to the system. This correct behavior, however, blocks the tester from testing the desired test case and obliges them to redo the test case, thereby wasting time. The method of allocating dummy equipment serial numbers promoted by the system reduces the likelihood of this scenario happening and thereby reduces wasted testing time. In an embodiment, dummy equipment serial numbers are stored in a flat file by the system. When a tester requests a dummy equipment serial number from the system, the system removes the dummy equipment serial number from the flat file and informs the tester of the dummy equipment serial number, for example by sending a message to the graphical user interface the tester uses to access the system. In another embodiment, the system may leave the dummy equipment serial number in the file but mark the dummy equipment serial number as used. A provision is made for an administrator to periodically recover unused dummy equipment serial numbers by editing the flat file containing the list of dummy equipment serial numbers. In an embodiment, the flat file is replaced by a database system.

The system also facilitates the efficient reporting and resolution of defects found during test calls and reducing the duplication of effort by geographically dispersed testers. The system hosts a defect board, a defect chat room, and a miscellaneous information board containing current contact information for the testers who are the primary users of these embodiments. The system also supports users posting defects to the defect board using a defect template, participating in defect chat sessions, and consulting the miscellaneous information board.

In an embodiment, testers may enter information about a failed test case into the system using a defect template. The tester sends the completed template to the system which extracts the defect information and posts it to the defect board, thereby making the information visible to other testers. This may reduce the chance that other testers may duplicate each others efforts, by discovering and reporting the same defect.

The defect board is regularly updated as the status of defects changes. The system sends notifications to testers containing information on newly reported defects and status changes of previously reported defects. The system chat room allows geographically dispersed teams to communicate live about the status of defects. While the detailed description describes several embodiments directed to testing telecommunications software applications and/or hardware, one skilled in the art, in combination with the present disclosure, will readily appreciate that the teaching disclosed herein also may be applied advantageously to testing software applications and hardware outside the telecommunications domain.

Figure 1:
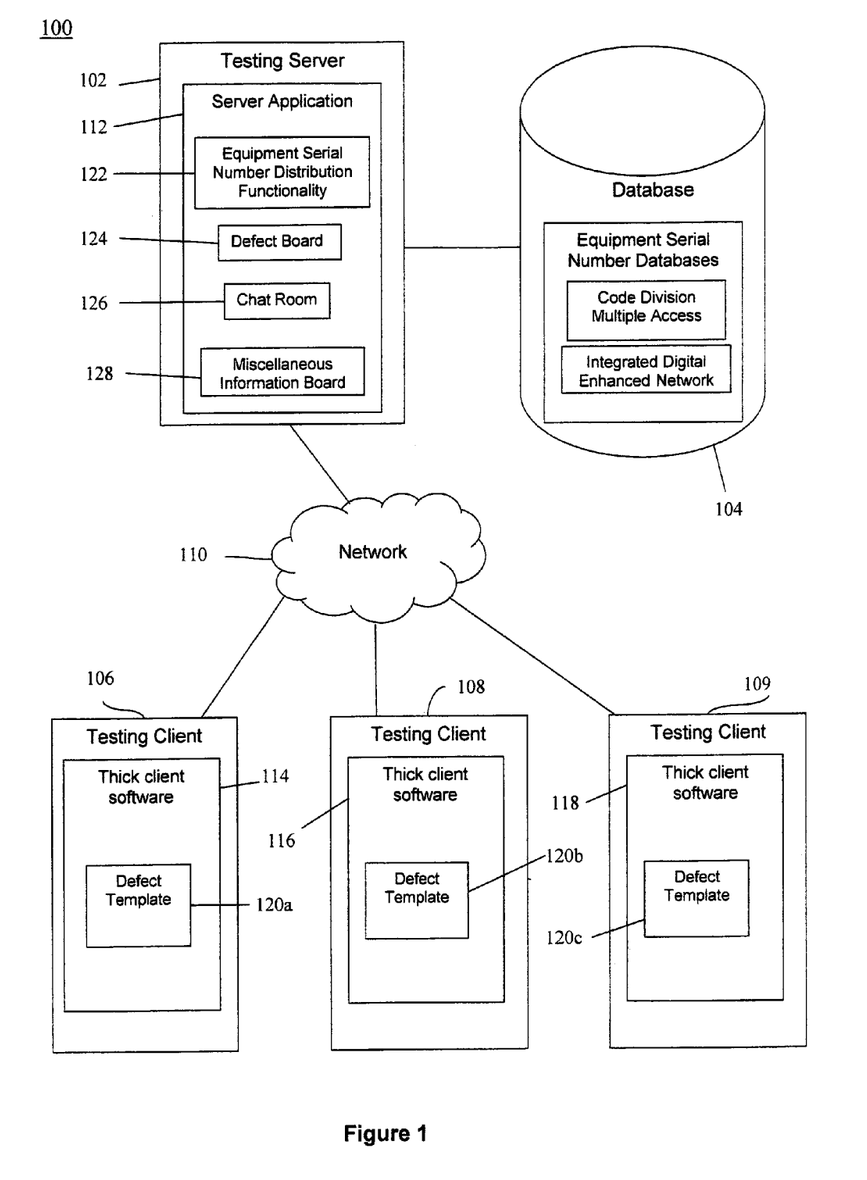
FIG. 1 is a block diagram of a system according to an embodiment of the disclosure.

Turning to FIG. 1, a system 100 for data management is described. The system 100 comprises a testing server 102, a database 104, a network 110 and a first testing client 106. In most embodiments the system 100 may comprise additional testing clients including a second testing client 108 and a third testing client 109.

The testing server 102 may be any general purpose computer system, as discussed in greater detail hereinafter. The testing server 102 may comprise one computer or a plurality of computers, for example a server farm wherein many server computers cooperate to share a processing load. The testing server 102 may comprise a plurality of computers which are located at different places, for example to provide geographical diversity and increased service reliability. The testing server 102 executes one or more applications that provide services to one or more of the testing clients 106, 108, 109 including distribution of equipment serial numbers and hosting of a defect management application 112. An the testing server 102 may execute an equipment serial number distribution functionality 122 application to promote organized distribution of equipment serial numbers.

The database 104 stores and makes information available to the testing server 102 and possibly other server computers that may execute applications unrelated to the system 100. The database 104 contains a store of dummy equipment serial numbers that may be used in testing telecommunications applications and/or hardware. For example, dummy equipment serial numbers may be used to promote testing mobile phone provisioning applications, for example applications used by mobile phone retail store personnel to bring a new mobile phone into service. The equipment serial numbers are held in the database until specifically requested by one of the testing clients 106, 108, 109. For each equipment serial number stored, the database 104 also stores a corresponding stock keeping unit (SKU) number and subscriber identification module (SIM) number which further aid in identifying the mobile device involved in a given test. The database 104 may be implemented in a variety of manners known to those skilled in the art, including as a relational database, as an object-oriented database or according to some other data storage/access principles. The database 104 may comprise multiple separate databases, for example a first database containing equipment serial numbers associated with code division multiple access (CDMA) technology and a second database containing equipment serial numbers associated with Integrated Digital Enhanced Network (iDEN)

Each of the testing clients 106, 108, 109 may be any general purpose computer system, as discussed in greater detail hereinafter. The first testing client 106 is a thick client and accordingly is capable of performing many functions independently without constant connection to the testing server 102 or any other server or device. More particularly, a thick client may also be referred to as a fat client and/or a heavy client. A thick client, for example the testing clients 106, 108, 109, is capable of providing the bulk of its capability independently, without support from a remote computer system or server, for example the testing server 102. The first testing client 106 is installed with a suite of thick client software 114 allowing the first testing client 106 to connect with the testing server 102, for example using Winsock client/server communications or other communication constructs. The thick client software 114 includes capabilities for the first testing client 106 to request and receive from the testing server 102 and store locally a variety of types of equipment serial numbers associated with both the code division multiple access and the Integrated Digital Enhanced Network mobile communications technologies. The thick client software 114 also includes capabilities for the first testing client 106 to send and receive email transmissions, fill out a defect template 120a, send the defect template 120a to the testing server 102, view a defect board 124 hosted on the testing server 102, view and make postings to a chat room 126 hosted on the testing server 102 and view a miscellaneous information board 128 hosted on the testing server 102.

The second testing client 108 and the third testing client 109 are installed with the same or very similar suite of thick client software 116 and 118, respectively, as the first testing client 106. Accordingly, the second testing client 108 and any additional testing clients have substantially the same capabilities as first testing client 106 as regards embodiments of the data management system 100. The thick client software 116 and 118 installed on the second testing client 108 and third testing client 109, respectively, includes defect templates 120b and 120c, respectively. These templates have the same capabilities as the defect template 120a included in thick client software 114 installed on first testing client 106.

In an embodiment, the software comprising the defect management application 112 may be modified to function using .NET, a software development framework and/or environment, or other software development environment. In these embodiments, thick client software 114 used by the testing clients 106, 108, 109 to access the functionality of the system 100 for defect management may be modified. The modifications may permit the testing clients 106, 108, 109 to use web browser software installed on the testing clients 106, 108, 109. In these embodiments, the web browser software may function within system 100 using the hypertext transfer protocol.

The network 110 provides communication between the testing server 102 and the testing clients 106, 108, 109. The testing clients 106, 108, 109 make requests across the network 110 to the testing server 102 for access to applications and data files, for example using Winsock connections or other communication constructs. Testing clients 106, 108, 109 also typically exchange electronic mail transmissions across the network 110. In an embodiment, the network 110 may also be spread across a geographic area including a campus of buildings, a metropolitan area, a geographic region or internationally.

In an embodiment, technicians (hereinafter "testers") are assigned to testing clients 106, 108, 109 on a one-to-one basis, one tester per testing client 106, 108, 109. In another embodiment, testers are assigned to testing clients 106, 108, 109 on a multiple-to-one basis, more than one tester assigned to use a single testing client. In this embodiment it is unlikely that testers would use the same testing client 106, 108, 109 simultaneously, rather on a shift basis.

Figure 2:
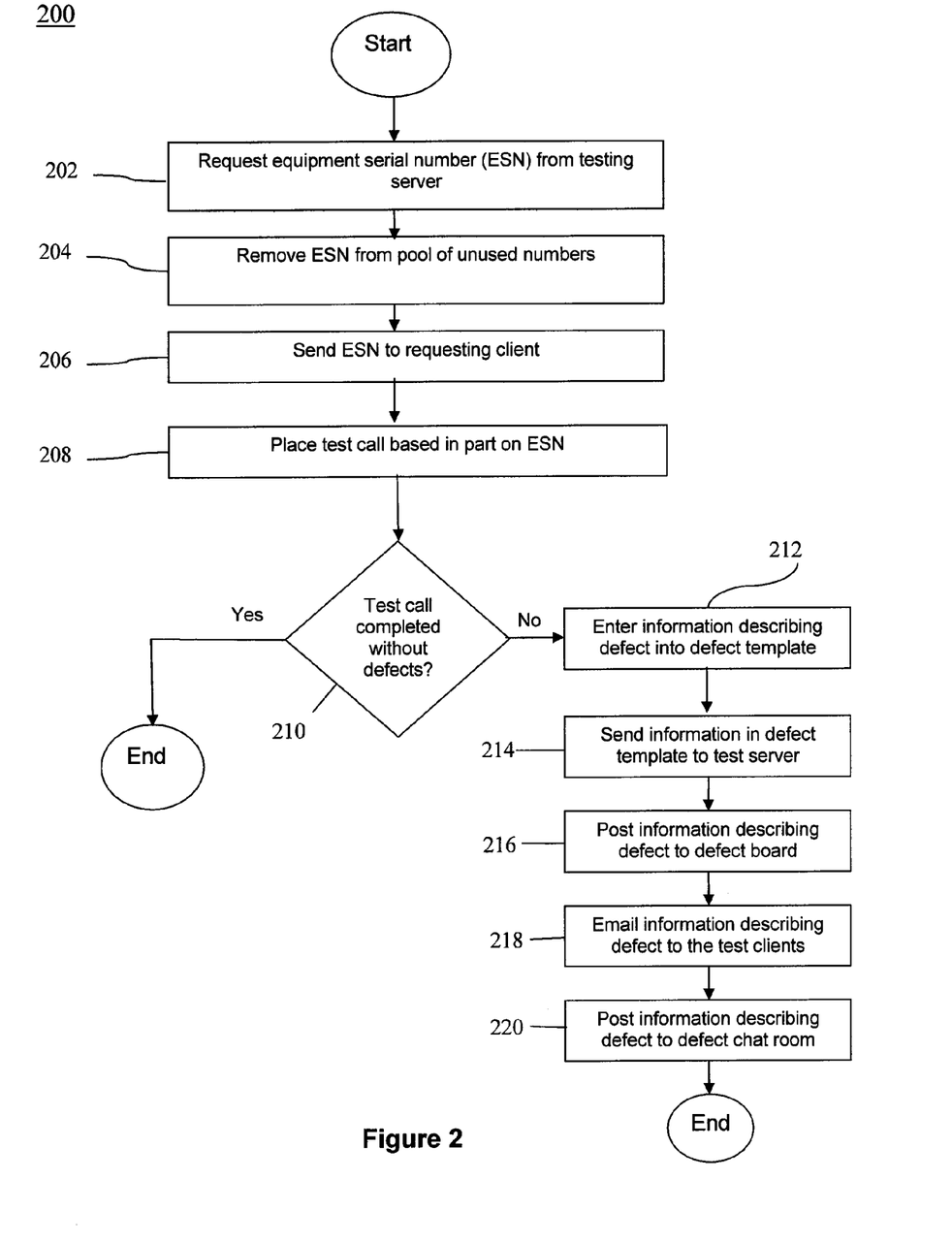
FIG. 2 is a flowchart illustrating a method according to an embodiment of the disclosure.

Turning to FIG. 2, a method 200 of testing a communication system will now be discussed. The method begins at block 202 where a tester wishes to execute a test case that is based on or needs an equipment serial number to execute. For example, the test case may involve placing an outgoing test telephone call, originating the test telephone call using either an actual specific mobile device or a mobile device mimicked by call simulation software. Alternatively, the test case may involve using a provisioning application or other application that uses or depends upon use of an equipment serial number to be executed. Needing an unused equipment serial number, the tester at testing client 106, using its first thick client software 114, sends a request for an equipment serial number to the testing server 102. In an embodiment, the type of device associated with the equipment serial number is not relevant.

In an embodiment, the tester needs an equipment serial number associated with either the code division multiple access technology or the integrated digital enhanced network technology to place a test call. In an embodiment in which the test involves code division multiple access technology, the tester activates a graphical user interface on the first testing client 106 which provides choices of code division multiple access device equipment serial numbers comprising different types of mobile devices, for example second generation (2G) code division multiple access, third generation (3G) voice/data, third generation evolution data only (EVDO), high performance push to talk (HPPTT), code division multiple access BOOST, code division multiple access mobile equipment identifier (MEID), and dual mode equipment serial number. For example, the tester may be executing a provisioning test case associated with a code division multiple access technology mobile phone. Alternatively, the tester may be executing a call test case associated with a code division multiple access technology mobile phone originating a call.

In an embodiment in which the test involves integrated digital enhanced network technology, the tester activates a graphical user interface on the first testing client 106 which provides the tester choices of integrated digital enhanced network device equipment serial numbers for different types of mobile devices, for example MSN/SIM, international mobile equipment identity (IMEI) and BOOST. BOOST refers to Boost Mobile, a trademarked telecommunications brand of wireless phones.

Once the tester chooses either the code division multiple access technology or the integrated digital enhanced network technology, the tester then submits their request for an equipment serial number appropriate for the chosen device by using the thick client software 114 installed on the first testing client 106 to send the request across the network 110 to the testing server 102. The testing server 102 forwards the request to the database 104. The database 104 locates within its records the specific pool of unused equipment serial numbers corresponding to the technology (code division multiple access or integrated digital enhanced network) and device type designated by the first testing client 106 in its request.

At block 204, the testing server 102 reserves one equipment serial number from the selected pool of unused equipment serial numbers stored in the database 104. The reserved equipment serial number is designated for use by the tester. The testing server 102 allocates each equipment serial number less than two times, either once for use by a specific testing client or not at all.

At block 206, the testing server 102 sends the equipment serial number to the first testing client 106. The first testing client 106 receives and stores the equipment serial number that will be used for executing the test case. The testing server 102 may also provide a corresponding stock keeping unit (SKU) number and subscriber identification module (SIM) number to the first testing client 106, in addition to and associated with the equipment serial number. Other data useful for executing the test case may also be provided by the testing server 102 to the first testing client 106.

At block 208, the tester proceeds with testing the subject software application and/or hardware using the equipment serial number received from the database 104. In an embodiment, the tester may employ a testing system that is distinct and separate from the system 100 to execute the test case.

At block 210, the tester monitors the results of executing the test case. If the test case fails, the method 200 proceeds to block 212 otherwise the method 200 exits. If a failed test case is identified, the tester may enter a record of the defect using a trouble reporting tool that is separate from the system 100, such as a Service Request reporting system or a bug reporting system.

At block 212, the tester enters information about the observed defect into the defect template 120a activated on the first testing client 106. The defect template 120a is used to gather information for posting to the defect board 124 hosted on the testing server 102. The information entered into the defect template 120a may comprise an assigned defect number, for example a serial number or other identity associated with the failed test case by the trouble reporting tool mentioned with reference to block 210 above, a defect severity level, a software application and/or a hardware component involved, a description of the defect, possibly including the actual error message received, if any, a name of tester who observed defect, and a description of the testing environment.

At block 214, the first testing client 106 sends the defect template 120a with filled-in information to the testing server 102.

At block 216, the testing server 102 posts the defect to the defect board 124 which displays currently open defects. The defect board 124 is visible to the first testing client 106 and the other testing clients 108 and 109 and serves the primary purpose of informing testing clients promptly of newly reported and currently open defects.

The defect board 124 may prevent situations in which two or more testers encounter the same or very similar defect conditions at nearly the same time and report the defect simultaneously, possibly creating confusion and duplicate work for testers. Without the defect board 124, testers in different locations encountering and reporting the same defect may have no practical way of being aware of this potential for confusion. The defect board 124 informs testing clients 106, 108, 109 of immediate activity on new defect reporting and resolution thus fostering a dynamic communal environment in which defect activity is rapidly disseminated and duplication of effort may be substantially reduced.

At block 218, a notification, for example an email, an instant message, or a text message, is sent to the testing clients 106, 108, 109 announcing the reporting and posting of the defect to the defect board 124. The notification contains substantially all of the information entered by the first testing client 106 into the defect template 120a and posted to the defect board 124 hosted by testing server 102.

At block 220, a message announcing the new defect is posted in the chat room 126 for viewing by the clients 106, 108, 109 and managers. The chat room 126 may be used for text participation by the testing clients 106, 108, 109 to communicate with one another and collectively about the posting of new defects, the ongoing status of currently open defects and the resolution of defects. The chat room 126 promotes instantaneous communication that brings the testing clients 106, 108, 109 into a single virtual venue. The chat room 126 is open continuously and available for use by the testing clients 106, 108, 109 and managers.

In an embodiment, the defect management application 112 may support establishment or creation of other chat rooms, in addition to the chat room 126, with individual chat rooms generally restricted to communications about specific projects by associated testers and testing clients 106, 108, 109. In the embodiment, the functionality of the defect management application 112 which posts entries to the chat room 126 would also make postings to an individual chat room in connection with defects arising from the project associated with the individual chat room.

When the testing client 106, 108, 109 receives notice that a previously reported defect has been resolved, rejected, found to be a duplicate of another reported defect or otherwise closed for any reason, a notification, for example an email, an instant message, or a text message, is sent to all testing clients announcing this activity. The subject defect is also promptly removed from the defect board 124 posted on the testing server 102 as the defect board 124 is reserved for listing of open defects only. Finally, the testing client 106, 108, 109 will make an entry to the chat room 126 advising of the change in the defect's status.

In an embodiment, the defect management application 112 may automatically synchronize the defect board 124 with entries, updates and/or other notifications of defect status changes made into a trouble reporting tool that is separate from the system 100, such as a service request reporting system or other bug reporting system.

The purpose of the chat room 126 is not limited to the testing clients 106, 108, 109 communicating about new defects or formal changes in the status of previously opened defects. In an embodiment, the testing clients 106, 108, 109 may also use the chat room 126 to informally discuss dialogue they have had with developers or managers, for example, about non-defect related behavior of software applications and/or hardware they are testing or anomalies or peculiarities of the application or related software, tools or hardware. Chat room 126 activity may address the availability of equipment serial numbers which are not unlimited in quantity and therefore merit discretion in use. The ultimate value of chat room 126 is in facilitating any productive communal discussion among the testing clients 106, 108, 109 not physically located together, with limited regard for formality.

In an embodiment, the chat room 126 may become lengthy over time and therefore unwieldy for the testing clients 106, 108, 109 and others to consult. An administrator will periodically close the current chat session and permanently save the session in a file for future consultation by all. A new chat session is then opened and maintained until the new session becomes lengthy, is closed and permanently saved, and the cycle begins again.

Figure 3:
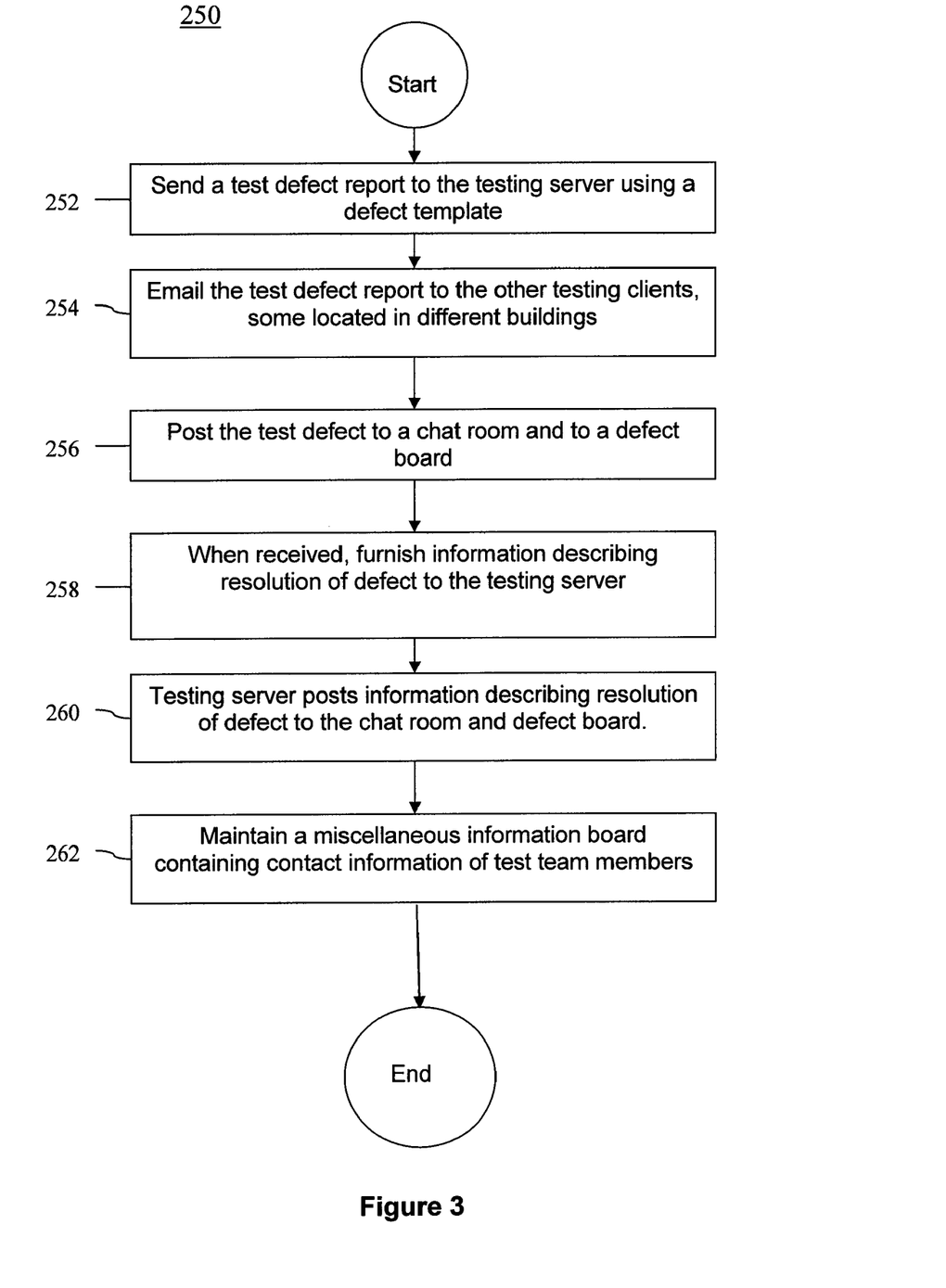
FIG. 3 is a flowchart illustrating another method according to an embodiment of the disclosure.

Turning now to FIG. 3, a method 250 of testing a communication system will now be discussed. In an embodiment the first testing client 106 may be located in a different building from the second testing client 108 and any additional testing clients. In telecommunications organizations in which enterprise software applications are undergoing tests, the testing clients 106, 108, 109 are often numerous and may be physically located in different buildings or may be geographically dispersed even more widely. In an embodiment, the first testing client 106 and the second testing client 108 are located in different states. In an embodiment, the second testing client 108, which is located in a different state from first testing client 106, follows substantially the same steps as described previously in requesting an equipment serial number. The tester initiates a test call and if the tester encounters a defect during a test call the tester would first report the condition to development.

The method 250 begins at block 252, where a test defect report is sent to the testing server 102 using the defect template. At block 254, an announcement or notification of the defect is sent to the test clients, for example test clients 106, 108, 109, some of which may be located in a different building, a different city, or a different state. The notification may be sent as any of an email message, an instant message, a text message, or as any other messaging protocol. At block 256, the testing server 102 posts the new defect to the defect board 124. The testing server 102 also posts text into the chat room 126 announcing the newly submitted defect At block 258, when the defect is resolved a testing client 106, 108, 108 sends information on the defect resolution to the testing server 102. At block 260, the testing server 102 posts this information regarding the defect resolution to both the chat room and the defect board 124.

In block 262, the testing server 102 may also maintain the miscellaneous information board 128 containing general and perhaps temporary and project-specific contact information for various individuals and groups within the organization. This information is typically volatile and therefore preferably may be more readily changeable and accessible than, for example, an electronic mail global address list. Contact information and other identifying data may also be contained about related parties such as dealers and distributors, as this information may be readily needed to conduct test calls.

Figure 4:
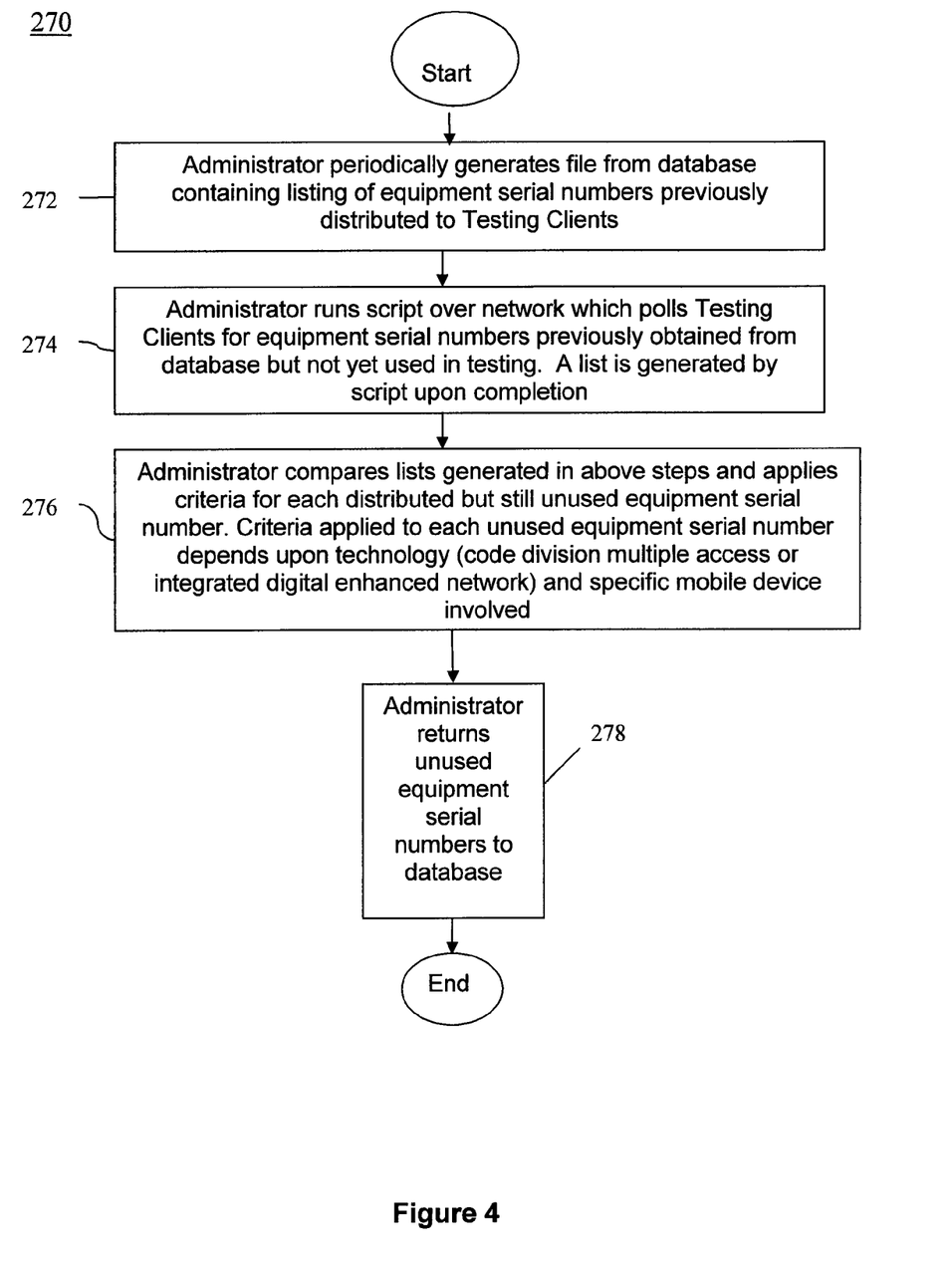
FIG. 4 is a flowchart illustrating another method according to an embodiment of the disclosure.

Turning now to FIG. 4, a method 270 for recovering unused equipment serial numbers is described. At block 272, an administrator periodically generates a file listing equipment serial numbers previously given or allocated to the testing clients 106, 108, 109 based on analysis of the contents of the database 104. This list may be generated based on a known initial allocation of equipment serial numbers stored in the database 104 compared with the presently observed equipment serial numbers stored in the database 104.

In block 274, the administrator may run a script which queries the testing clients 106, 108, 109 for equipment serial numbers that the testing clients 106, 108, 109 have received, but not yet used, and then creates a list of these unused equipment serial numbers. In an embodiment, there may be a time delay between generating the list of allocated equipment serial numbers and generating the list of unused equipment serial numbers, for example a time delay of fifteen minutes, thirty minutes, or an hour or so. This time delay may reduce the chance that a tester requests an equipment serial number and the method 270 executes before the tester has the opportunity to place the test call intended to use the equipment serial number.

In block 276, the administrator compares the list obtained from the database 104 with the script-generated list created by querying the testing clients 106, 108, 109. In an embodiment, the comparison may be performed by a script rather than a human administrator visually comparing the lists. In either case, any unused equipment serial numbers are identified. At block 278, the administrator returns unused equipment serial numbers to the database 104 or otherwise notes in the database that the equipment serial numbers are available. The administrator may also delete any other remaining records of or references to unused serial numbers on the testing clients 106, 108, 109. The method 270 completes.

Tools and processes employed in the method 270 are used in a consistent manner across a group of tests, either within a software project, an operating or testing unit or the enterprise. This consistency improves the effectiveness of recovery of unused equipment serial numbers.

Figure 5:
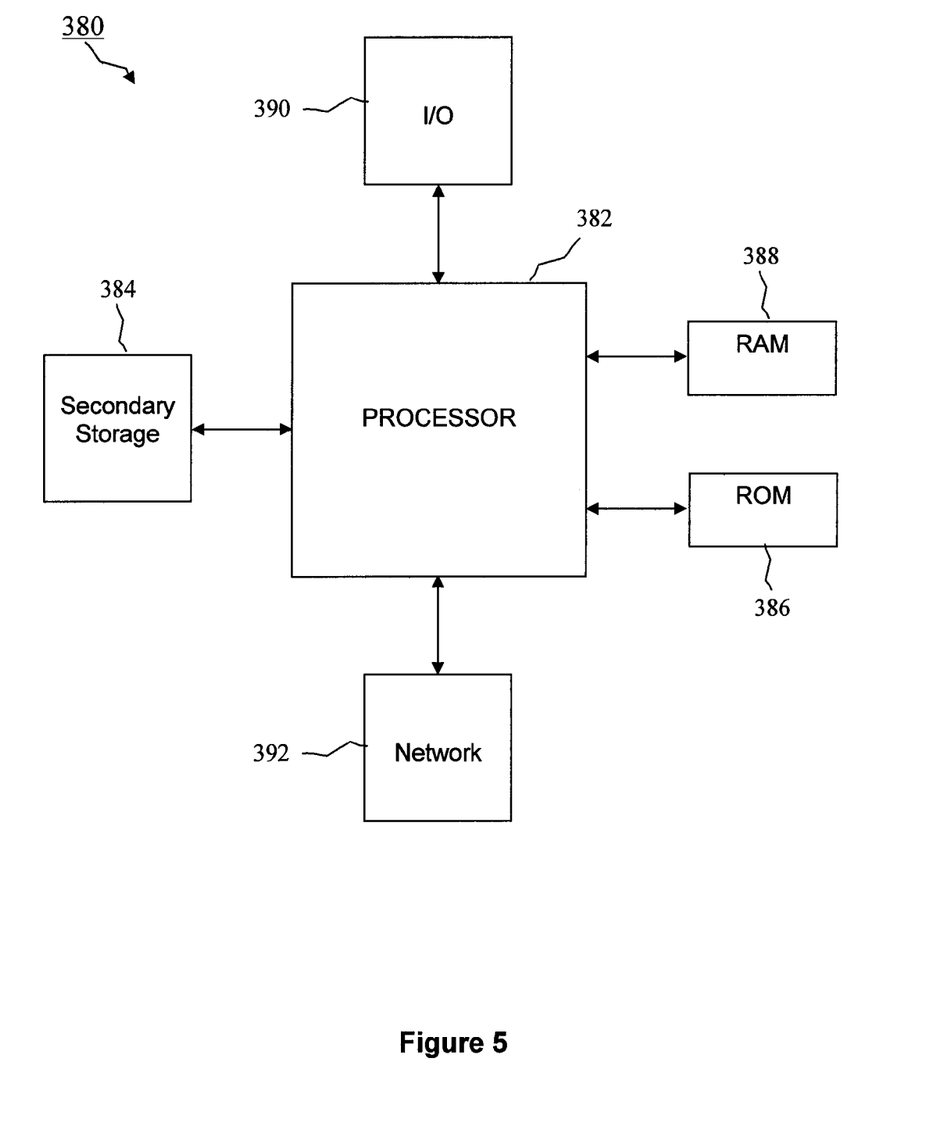
FIG. 5 illustrates an exemplary general purpose computer system suitable for implementing the several embodiments of the disclosure.

Portions of the system 100 may be implemented on any general-purpose computer with sufficient processing power, memory resources, and network throughput capacity to handle the necessary workload placed upon it. For example, the testing server 102, the testing clients 106, 108 and all other testing clients may be implemented on a general-purpose computer. FIG. 5 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access and/or global system for mobile communications (GSM) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system testing tool, comprising:
   a first processor;
   a server application that, when executed on the first processor, promotes managing allocation of equipment serial numbers (ESNs) used in executing test cases related to mobile devices, aggregates test progress data in a defect board, and sends a notification of a defect when the defect is reported to the server application;
   a second processor; and
   a thick client that, when executed on the second processor, receives the notification of the defect, participates in a test chat forum, requests one of the equipment serial numbers from the server application, wherein the thick client presents a defect template for receiving defect information and reports the defect information to the server application.

2. The system of claim 1, wherein executing test cases includes at least one of originating a test call from a mobile device, terminating a test call on a mobile device, or provisioning a mobile device using a provisioning application.

3. The system of claim 1, wherein the server application manages allocation of equipment serial numbers by allocating each equipment serial number less than two times.

4. The system of claim 1, wherein the test cases and the test progress data are associated with at least one of code division multiple access (CDMA) and integrated dispatch enhanced network (iDEN) wireless communications.

5. The system testing tool of claim 1, wherein the thick client communicates with the server application at least in part using a socket.

6. The system testing tool of claim 1, wherein the thick client participation in the test chat forum includes posting a message in the test chat forum associated with the defect.

7. The system testing tool of claim 1, wherein the server application further maintains miscellaneous information associated with a testing team, the miscellaneous information comprising contact information of a plurality of members of the testing team.

8. A method of testing a communication system, comprising:
   a plurality of testing clients requesting an equipment serial number (ESN) from a testing server;
   the testing server reserving a plurality of equipment serial numbers for the testing clients from a pool of unused equipment serial numbers;
   the testing server sending the equipment serial numbers to the testing clients;
   generating a list of unused reserved equipment serial numbers;
   returning the unused reserved equipment serial numbers to the pool of unused equipment serial numbers;
   executing a test case based at least in part on one of the equipment serial number;
   entering information describing a defect associated with the test case, the information entered into a defect template;
   a first testing client sending the information describing the defect to the testing server;
   the testing server sending the information describing the defect to a second testing client;
   the testing server posting the information describing the defect to a defect board; and
   the testing server posting the information describing the defect to a first defect chat room.

9. The method of claim 8, wherein the list of unused reserved equipment serial numbers is generated by executing a script.

10. The method of claim 8, further including the testing server deleting the unused equipment serial numbers from the testing clients.

11. The method claim 8 further including:
    opening a second defect chat room for posting the information describing the defect;
    closing the first defect chat room for posting the information describing the defect; and
    searching the first defect chat room.

12. The method of claim 8, wherein the defect template comprises information fields for a defect severity, a defect number, an application identity, a defect description, an environment, a blocked test cases, and a defect.

13. The method of claim 8, wherein the testing server sends a stock keeping unit (SKU) number and a subscriber identification module (SIM) information to the testing clients with the equipment serial numbers.

14. A method of testing, comprising:
    a first testing client sending a first test defect report to a testing server, the first test defect report based on a defect template;
    the testing server sending notification of the first test defect report to a second testing client;
    the testing server posting the first test defect to a chat room and to a defect board; and
    the testing server maintaining a miscellaneous information board, the miscellaneous information including at least contact information of a plurality of test team members,
    wherein the first test defect is related to a test case related to testing at least one of a mobile phone provisioning application and at least a portion of a mobile phone communication system.

15. The method of claim 14, wherein the first testing client is executed on a computer located in a first building and the second testing client is executed on a computer located in a second building.

16. The method of claim 14, further including:
    the second testing client sending a second test defect report to the testing server, the second test defect report based on the defect template;
    the testing server sending notification of the second test defect report to the first testing client; and
    the testing server posting the second test defect to the chat room, to the defect board.

17. The method of claim 14, further including:
    the first testing client sending information describing a resolution of the first defect to the testing server; and
    the testing server posting the information describing the resolution of the first defect to the chat room and to the defect board.

18. The method of claim 14, wherein the notification is sent as one of an email notification, an instant message notification, and a short message service notification.

* * * * *